(12) United States Patent
Takada

(10) Patent No.: US 11,867,592 B2
(45) Date of Patent: Jan. 9, 2024

(54) STRUCTURE DISPLACEMENT AMOUNT MEASUREMENT APPARATUS

(71) Applicant: NEC Corporation, Tokyo (JP)

(72) Inventor: Jun Takada, Tokyo (JP)

(73) Assignee: NEC CORPORATION, Tokyo (JP)

(*) Notice: Subject to any disclaimer, the term of this patent is extended or adjusted under 35 U.S.C. 154(b) by 207 days.

(21) Appl. No.: 17/434,524

(22) PCT Filed: Dec. 17, 2019

(86) PCT No.: PCT/JP2019/049462
§ 371 (c)(1),
(2) Date: Aug. 27, 2021

(87) PCT Pub. No.: WO2020/179188
PCT Pub. Date: Sep. 10, 2020

(65) Prior Publication Data
US 2022/0136927 A1 May 5, 2022

(30) Foreign Application Priority Data
Mar. 1, 2019 (JP) .................... 2019-037816

(51) Int. Cl.
G01M 5/00 (2006.01)
(52) U.S. Cl.
CPC .......... G01M 5/0008 (2013.01); G01M 5/005 (2013.01)
(58) Field of Classification Search
None
See application file for complete search history.

(56) References Cited

U.S. PATENT DOCUMENTS

2018/0245969 A1   8/2018  Imagawa et al.
2019/0212141 A1*  7/2019  Takada ............... G01B 11/16
(Continued)

FOREIGN PATENT DOCUMENTS

JP   2002-090233 A   3/2002
JP   2005-189074 A   7/2005
(Continued)

OTHER PUBLICATIONS

International Search Report for PCT Application No. PCT/JP2019/049462, dated Mar. 24, 2020.
(Continued)

Primary Examiner — Raul J Rios Russo
Assistant Examiner — Carl F. R. Tchatchouang

(57) ABSTRACT

A structure displacement amount measurement apparatus includes: an acquiring unit configured to acquire a displacement amount caused on a structure by a weight of a vehicle traveling on the structure along a time series; an estimating unit configured to estimate a section in which displacement is caused based on time-series data of the displacement amount; a detecting unit configured to detect a feature value of change in displacement amount within the estimated section; a determining unit configured to determine whether or not the estimated section is a section of displacement due to a weight of a single vehicle based on the detected feature value; and an extracting unit configured to extract a displacement amount from the time-series data within a section of displacement due to a weight of a single vehicle based on a result of the determination.

7 Claims, 7 Drawing Sheets

(56) References Cited

U.S. PATENT DOCUMENTS

2019/0226904 A1* 7/2019 Imagawa ............... G01G 19/03
2020/0191824 A1* 6/2020 Miki ....................... G01P 15/18

FOREIGN PATENT DOCUMENTS

| | | | |
|---|---|---|---|
| JP | 2006-084404 | A | 3/2006 |
| JP | 2010-197249 | A | 9/2010 |
| JP | 2013-174481 | A | 9/2013 |
| JP | 2015-140537 | A | 8/2015 |
| JP | 2016-084579 | A | 5/2016 |
| JP | 2017-027468 | A | 2/2017 |
| JP | 6273502 | B | 2/2018 |
| JP | 2018-066637 | A | 4/2018 |
| JP | 2018204952 | A * | 12/2018 |
| KR | 10-1231791 | B1 | 2/2013 |

OTHER PUBLICATIONS

Japanese Office Action for JP Application No. 2021-503420 dated Apr. 13, 2022 with English Translation.

* cited by examiner

STRUCTURE DISPLACEMENT AMOUNT MEASUREMENT APPARATUS

This application is a National Stage Entry of PCT/JP2019/049462 filed on Dec. 17, 2019, which claims priority from Japanese Patent Application 2019-037816 filed on Mar. 1, 2019, the contents of all of which are incorporated herein by reference, in their entirety.

TECHNICAL FIELD

The present invention relates to a structure displacement amount measurement apparatus, a structure displacement amount measurement method, and a recording medium.

BACKGROUND ART

When a vehicle passes a structure such as a bridge, a load is applied to the structure and the structure is displaced. As a technique for obtaining such displacement of a structure, various techniques for obtaining displacement caused on a structure by the load of a single vehicle have been proposed.

For example, Patent Document 1 describes a technique for measuring the deflection amount of a bridge when a given vehicle passes the bridge by using images captured by a video camera and a digital camera. To be specific, a characteristic of a vehicle traveling on a bridge is identified from a moving image captured by a video camera capturing the bridge, and a timing at which only a given vehicle is passing the bridge is detected. Then, an image of the bridge is captured by a digital camera at the detected timing, and the deflection amount of the bridge is detected based on the captured image Further, Patent Document 2 describes a technique for measuring the amount of displacement caused on an asphalt travel lane by the passage of a vehicle. To be specific, a tire of a vehicle is recognized from an image of a travel lane captured by an image capture device, and a region on the travel lane corresponding to the lowest point of the tire is specified as an axle load position. Then, the displacement of the travel load at the axle load position is detected based on the image captured by the image capture device.

Patent Document 1: Japanese Unexamined Patent Application Publication No. 2016-084579
Patent Document 2: Japanese Patent No. 6273502

However, the technique described in Patent Document 1 requires to detect that only one vehicle exists on a structure from an image captured by a video camera capturing the structure other than a digital camera measuring the displacement of the structure, which is not easy. On the other hand, according to the technique described in Patent Document 2, one vehicle is specified from an image captured by an image capture device measuring the displacement amount of a structure, and therefore, one image capture device is used. However, for example, in a case where the deflection amount of the floor deck of a bridge is measured from an image captured by a camera installed under the bridge, a vehicle passing the bridge is not shown in the image of the floor deck. Under such a measurement environment that a vehicle traveling on a structure is not shown in a captured image for measuring displacement, there is a need to detect that only one vehicle exists on the structure from an image captured by another camera.

SUMMARY

An object of the present invention is to provide a structure displacement amount measurement apparatus which solves the abovementioned problem; it is difficult to easily calculate the amount of displacement caused on a structure with the weight of a single vehicle.

A structure displacement amount measurement apparatus according to an aspect of the present invention includes: an acquiring unit configured to acquire a displacement amount caused on a structure due to a weight of a vehicle traveling on the structure along a time series; an estimating unit configured to estimate a section in which displacement is caused based on time-series data of the displacement amount; a detecting unit configured to detect a feature value of change in displacement amount within the estimated section; a determining unit configured to determine whether or not the estimated section is a section of displacement due to a weight of a single vehicle based on the detected feature value; and an extracting unit configured to extract a displacement amount from the time-series data within a section of displacement due to a weight of a single vehicle based on a result of the determination.

Further, a structure displacement amount measurement method according to another aspect of the present invention includes: acquiring a displacement amount caused on a structure due to a weight of a vehicle traveling on the structure along a time series; estimating a section in which displacement is caused based on time-series data of the displacement amount; detecting a feature value of change in displacement amount within the estimated section; determining whether or not the estimated section is a section of displacement due to a weight of a single vehicle based on the detected feature value; and extracting a displacement amount from the time-series data within a section of displacement due to a weight of a single vehicle based on a result of the determination.

Further, in a non-transitory computer-readable recording medium according to another aspect of the present invention, a program is recorded. The program includes: a process of acquiring a displacement amount caused on a structure due to a weight of a vehicle traveling on the structure along a time series; a process of estimating a section in which displacement is caused based on time-series data of the displacement amount; a process of detecting a feature value of change in displacement amount within the estimated section; a process of determining whether or not the estimated section is a section of displacement due to a weight of a single vehicle based on the detected feature value; and a process of extracting a displacement amount from the time-series data within a section of displacement due to a weight of a single vehicle based on a result of the determination.

With the configurations as described above, the present invention makes it possible to simply calculate the amount of displacement caused on a structure by the weight of a single vehicle.

EXAMPLE EMBODIMENTS

Next, example embodiments of the present invention will be described in detail with reference to the drawings.

First Example Embodiment

Figure 1:
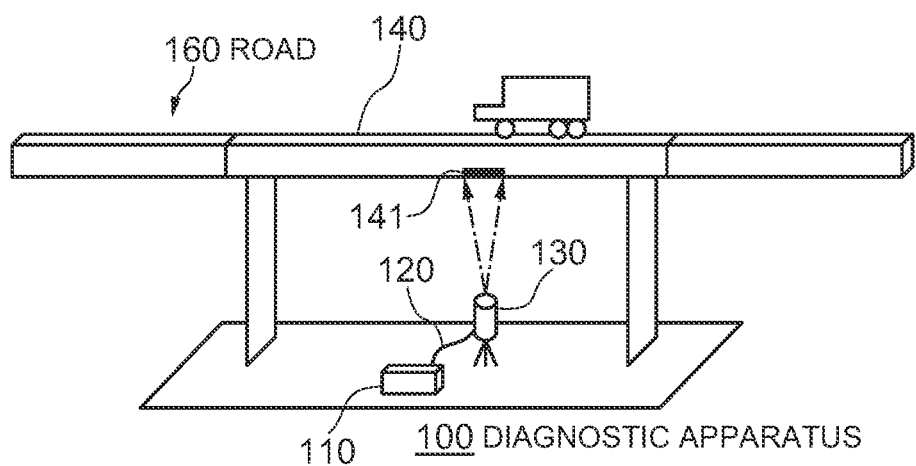
FIG. 1 is a view showing a configuration example of a diagnostic apparatus according to a first example embodiment of the present invention.

FIG. 1 is a view showing a configuration example of a diagnostic apparatus 100 according to a first example embodiment of the present invention. Referring to FIG. 1, the diagnostic apparatus 100 includes a computer 110 and a camera 130 connected to the computer 110 via a cable 120.

The camera 130 is an image capture device that captures a region 141 existing on the surface of a structure 140 to be diagnosed at a given frame rate. In this example embodiment, the structure 140 is a bridge on which a road 160 such as an expressway crosses over a river or the like. In this example embodiment, the region 141 is part of a floor deck that is a diagnosis spot of the bridge. However, the structure 140 is not limited to a bridge. The structure 140 may be an elevated structure of an expressway or a railway, or the like. The size of the region 141 is, for example, several tens of centimeters square. The camera 130 is attached to a pan head (not shown) on a tripod (not shown) so that the shooting direction of the camera can be fixed in any direction. The camera 130 may be, for example, a high-speed camera that includes a CCD (Charge-Coupled Device) image sensor or a CMOS (Complementary MOS) image sensor having pixel capacity of about several million pixels. Moreover, the camera 130 may be a black and white camera, or may be an infrared camera or a color camera. Moreover, the camera 130 may include a GPS receiver that measures the position of the camera, or may include an orientation sensor and an acceleration sensor that measure the shooting direction of the camera.

The computer 110 is configured to acquire a time-series image of the structure 140 captured by the camera 130 via the cable 120. Moreover, the computer 110 is configured to measure the displacement amount of the structure 140 based on the acquired time-series image. In this example embodiment, a displacement amount to be measured is a deflection amount. Moreover, the computer 110 is configured to determine the soundness of the structure 140 based on a plurality of measured displacement amounts, and output the result of the determination.

Figure 2:
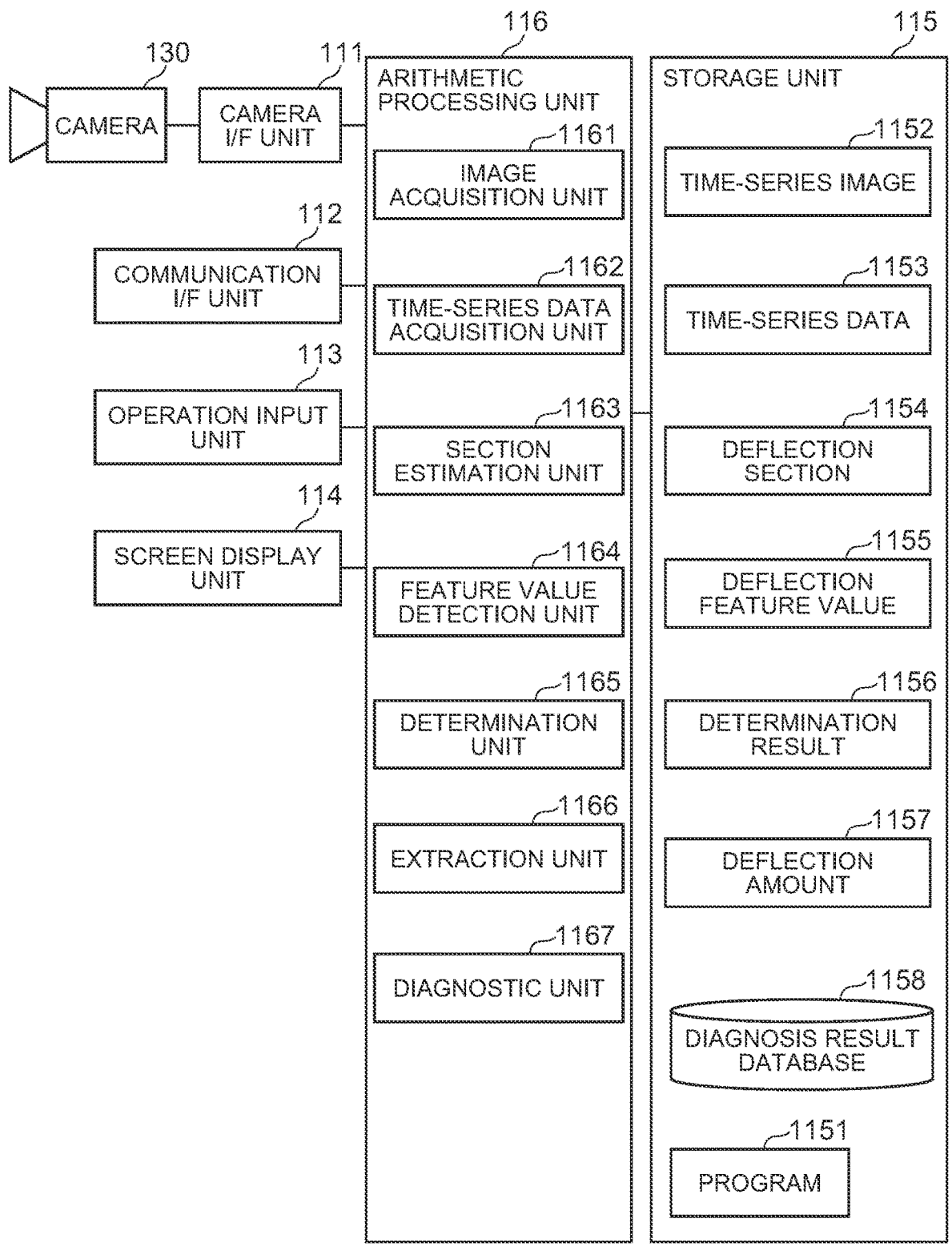
FIG. 2 is a block diagram showing an example of a configuration of a computer in the diagnostic apparatus according to the first example embodiment of the present invention.

FIG. 2 is a block diagram showing an example of a configuration of the computer 110. Referring to FIG. 2, the computer 110 includes a camera I/F (interface) unit 111, a communication I/F unit 112, an operation input unit 113, a screen display unit 114, a storage unit 115, and an arithmetic processing unit 116.

The camera I/F unit 111 is connected to the camera 130 through the cable 120, and is configured to perform transmission and reception of data with the camera 130 and the arithmetic processing unit 116. The communication I/F unit 112 is composed of a data communication circuit, and is configured to perform data communication with an external device (not shown) by wired or wireless communication. The operation input unit 113 is composed of an operation input device such as a keyboard and a mouse, and is configured to detect an operator's operation and output to the arithmetic processing unit 116. The screen display unit 114 is composed of a screen display device such as an LCD (Liquid Crystal Display), and is configured to display various information such as a menu screen on a screen in response to an instruction from the arithmetic processing unit 116.

The storage unit 115 is composed of a storage device such as a hard disk and a memory, and is configured to store processing information and a program 1151 that are necessary for various processes in the arithmetic processing unit 116. The program 1151 is a program that is loaded to and executed by the arithmetic processing unit 116 to realize various processing units, and is previously loaded from an external device or a recording medium, which are not shown, via a data input/output function such as the communication I/F unit 112 and stored into the storage unit 115. Major processing information stored in the storage unit 115 are a time-series image 115, time-series data 1153, a deflection section 1154, a deflection feature value 1155, a determination result 1156, a deflection amount 1157, and a diagnosis result database 1158.

The time-series image 1152 is a time-series image captured by the camera 130. This time-series image 1152 may be a plurality of frame images composing a moving image of the region 141 of the structure 140 captured by the camera 130. Each frame image is provided with capture time.

Figure 3:
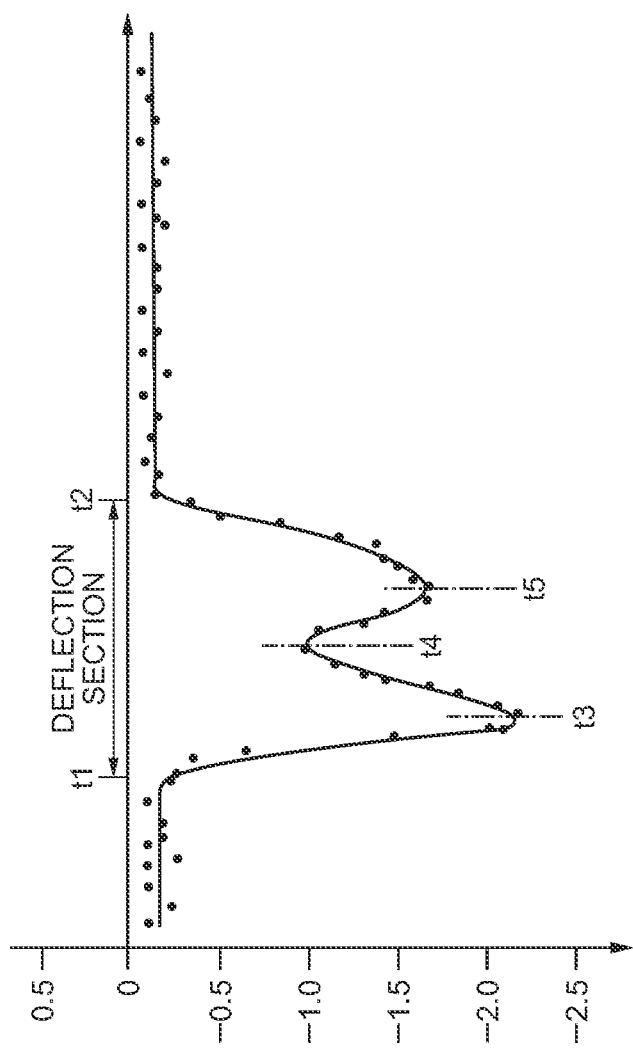
FIG. 3 is a schematic diagram showing an example of temporal change in displacement amount of the surface of a structure according to the first example embodiment of the present invention.

The time-series data 1153 is data representing temporal change in the amount of deflection caused in the region 141 of the structure 140 by the weight of a vehicle traveling on the structure 140. The time-series data 1153 is generated based on the time-series image 1152. FIG. 3 shows an example of the time-series data 1153. The vertical axis of a graph shown in FIG. 3 represents a deflection amount, and the horizontal axis represents time. Dots drawn in the graph each represents the value of a deflection amount at certain time. A solid line shown in the graph of FIG. 3 shows a change pattern that characteristically represents temporal change in deflection amount. Such a change pattern can be generated, for example, by regarding a polygonal line obtained by connecting the dots in chronological order as a signal waveform and passing the signal waveform through a low-pass filter. Alternatively, the change pattern as described above can be obtained as an approximate curve that minimizes the squared error of a distance from the deflection amount represented by the dots.

The deflection section 1154 is data representing a section in which deflection is caused in the region 141 of the structure 140. The deflection section 1154 is generated based on the time-series data 1153. For example, in the time-series data shown in FIG. 3, there is almost no change in deflection amount until time t1, the deflection amount changes in a section from time t1 to time t2, and there is almost no change in deflection amount again after time t2. In the time-series data showing such a change pattern, the section from time t1 to time t2 is estimated to be a deflection section.

The deflection feature value 1155 is data representing a feature value of change in deflection amount within the deflection section 1154. For example, a maximal value of a deflection amount is an example of the deflection feature value 1155. Moreover, a minimal value of a deflection amount is another example of the deflection feature value 1155. For example, in the time-series data shown in FIG. 3, the deflection amount changes from increase to decrease at time t3, and therefore, the deflection amount at time t3 is a maximal value. Moreover, since the deflection amount changes from decrease to increase at time t4, the deflection amount at time t4 is a minimal value. Moreover, since the deflection amount changes from increase to decrease at time t5, the deflection amount at time t5 is a maximal value. That is to say, the time-series data shown in FIG. 3 has two maximal values and one minimal value in one deflection section.

The determination result 1156 is a determination result showing whether or not the deflection section 1154 is a section of deflection due to the weight of a single vehicle. The determination result 1156 is derived based on the deflection feature value 1155.

The deflection amount 1157 is data representing a deflection amount in a deflection section due to the weight of a single vehicle. The deflection amount 1157 is the maximum value of the deflection amount in the deflection section, for example.

The diagnosis result database 1158 is configured so that information relating to a diagnosis result is stored. For example, in the diagnosis result database 1158, a set of an ID assigned to a diagnosis spot, the date and time of diagnosis and a diagnosis result is stored.

The arithmetic processing unit 116 includes a processor such as an MPU and its peripheral circuit, and is configured to load the program 1151 from the storage unit 115 and execute to make the above hardware and the program 1151 cooperate and realize various processing units. Major processing units realized by the arithmetic processing unit 116 are an image acquisition unit 1161, a time-series data acquisition unit 1162, a section estimation unit 1163, a feature value detection unit 1164, a determination unit 1165, an extraction unit 1166, and a diagnostic unit 1167.

The image acquisition unit 1161 is configured to acquire a time-series image captured by the camera 130 through the camera I/F unit 111, and add the acquired time-series image to the time-series image 1152 of the storage unit 115 and store.

The time-series data acquisition unit 1162 is configured to acquire the amount of deflection caused on the structure 140 by the weight of a vehicle traveling on the structure 140 along a time series based on the time-series image 1152 stored in the storage unit 115, and store the time series of the acquired deflection amounts as the time-series data 1153 into the storage unit 115. For example, the time-series data acquisition unit 1162 retrieves all of the time-series image 1152 stored in the storage unit 115, and measures temporal change in deflection amount of the surface of the structure 140 from each of the time-series image. For example, in a case where an image of the floor deck of a bridge is captured by a camera from below, a capture length L from the camera to the floor deck is shortened by an amount δ of deflection caused on the floor deck of the bridge by a vehicle weight. Therefore, the captured image is magnified about the optical axis of the camera, and apparent displacement δ, due to deflection occurs. When a capture length is L, displacement is $δ_i$, a deflection amount is δ, a distance from the camera optical axis of a displacement calculation position is x, and the focal length of the camera is f, a relation of $δ_i = xf\{1/(L-δ) - 1/L\}$ is established. Thus, by detecting the displacement $δ_i$ for each frame by a digital image correlation method or the like, it is possible to calculate a deflection amount on the surface of the structure 140 for each frame image from the above equation. The capture length L can be measured in advance, for example, by a laser range finder, the distance x can be obtained from the displacement calculation position of the image and the camera optical axis, and f is known for each imaging device.

The section estimation unit 1163 is configured to estimate a section in which deflection is caused on the structure 140 based on the time-series data 1153 stored in the storage unit 115 and store the section as the deflection section 1154 into the storage unit 115. For example, the section estimation unit 1163 estimates a deflection section in the following manner.

<Deflection Section Estimation Method 1>

Figure 4:
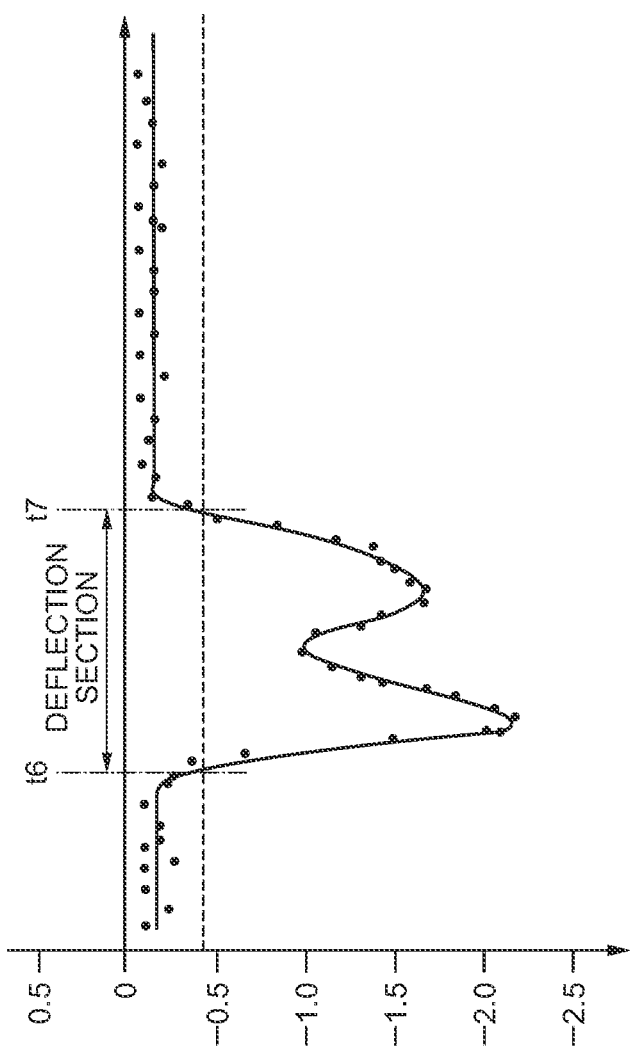
FIG. 4 is a schematic diagram for describing an example of a method for estimating a deflection section according to the first example embodiment of the present invention.

The section estimation unit 1163 estimates a deflection section by comparing the time-series data 1153 with a deflection detection threshold value previously set and stored. For example, in a case where the deflection detection threshold value is set as indicated by a broken line of FIG. 4, the section estimation unit 1163 detects, as a deflection section, a section from time $t_6$ at which a deflection amount shown by the time-series data 1153 (or a change pattern thereof) increases from a value equal to or less than the deflection detection threshold value to a value equal to or more than the deflection detection threshold value to time $t_7$ at which the deflection amount decreases next from a value equal to or more than the deflection detection threshold value to a value equal to or less than the deflection detection threshold value.

<Deflection Section Estimation Method 2>

Figure 5:
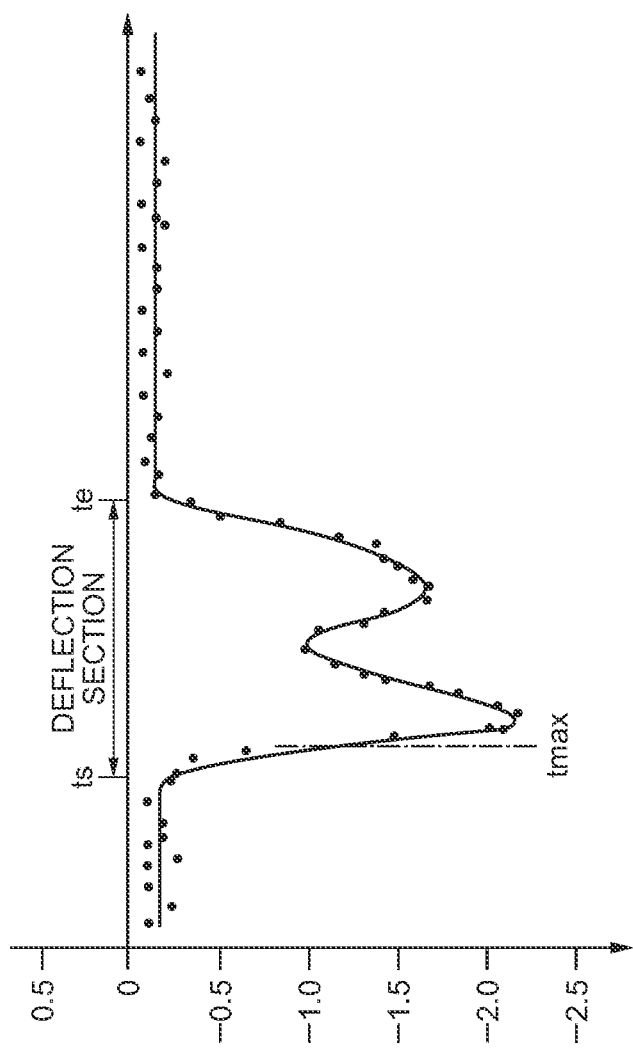
FIG. 5 is a schematic diagram for describing another example of the method for estimating a deflection section according to the first example embodiment of the present invention.

The section estimation unit 1163 divides the time-series data 1153 (or a change pattern thereof) in the temporal axis direction into a plurality of partial time-series data. For example, the time length of one partial time-series data is determined in accordance with a time necessary for one vehicle to pass through the region 141 of the structure 140. Next, the section estimation unit 1163 detects time at which the rate of change in deflection amount is maximum from the partial time-series data. This time will be denoted by $t_{max}$. Next, the section estimation unit 1163 detects, before and after time $t_{max}$, times at which both the rate of change in deflection amount and the acceleration become equal to or less than a threshold rate and a threshold acceleration that are previously set and stored. These times before and after time $t_{max}$ will be denoted by $t_s$ and $t_e$. Next, the section estimation unit 1163 sets a section from time $t_s$ to time $t_e$ as the deflection section. For example, assuming that the time-series data (or its change pattern) shown in FIG. 5 is one partial time-series data, the section estimation unit 1163 detects time $t_{max}$ at which the rate of change in deflection amount is maximum. Next, the section estimation unit 1163 detects the first time $t_s$ at which both the rate of change in deflection amount and the acceleration become equal to or less than the threshold rate and the threshold acceleration while returning to the past time by unit time starting from time $t_{max}$. Moreover, the section estimation unit 1163 detects the first time $t_e$ at which both the rate of change in deflection amount and the acceleration become equal to or less than the threshold rate and the threshold acceleration while advancing to the future time by unit time starting from time $t_{max}$.

The feature value detection unit 1164 is configured to retrieve the time-series data 1153 and the deflection section 1154 from the storage unit 115, detect, for each deflection section indicated by the deflection section 1154, a feature value (a maximal value, a minimal value) of change in deflection amount within the deflection section from the time-series data 1153, and store as the deflection feature value 1155 into the storage unit 115.

The determination unit 1165 is configured to retrieve the deflection feature value 1155 of each deflection section from the storage unit 115, determine, for each deflection section, whether or not to be a section of deflection due to the weight of a single vehicle based on the deflection feature value 1155 of the deflection section, and store as the determination result 1156 into the storage unit 115. To be specific, the determination unit 1165 determines a deflection section containing two or more maximal values and a deflection section containing one or more minimal value not to be a section of deflection due to the weight of a single vehicle. Moreover, the determination unit 1165 determines a section containing one maximal value and no minimal value to be a section of deflection due to the weight of a single vehicle. The reason is as follows.

Assuming that a bridge as the structure 140 is a simple girder, a deflection amount when one vehicle passes the bridge increases from a deflection amount of almost zero to a deflection amount according to the weight of the vehicle, and then decreases to a deflection amount of zero again. That is to say, when one vehicle passes the bridge, one maximal value (maximum value) appears in the change pattern of the deflection amount, and a minimal value does not appear. On the other hand, in a case where, while one vehicle is passing the bridge, one or more following vehicles enter the bridge, the deflection amount on the bridge is affected by the following vehicles. Therefore, depending on the interval between the preceding vehicle and the following vehicle, the weight difference between the two vehicles, and so on, such a phenomenon occurs that a deflection amount having begun to decrease is affected by the following vehicle and starts to increase again before returning to almost zero. That is to say, when a plurality of vehicles pass the bridge, a plurality of maximal values and one or more minimal values may arise in the deflection amount of the bridge. In this example embodiment, such a phenomenon is focused on and a deflection section due to the weight of a single vehicle is detected based on the feature value (maximal value, minimal value) of the change pattern of the deflection amount.

The extraction unit 1166 is configured to retrieve the determination result 1156 from the storage unit 115, extract the maximum value of deflection amount from the time-series data 1153 within a deflection section detected as a section of deflection due to the weight of a single vehicle, and store as the deflection amount 1157 into the storage unit 115.

The diagnostic unit 1167 is configured to perform a deterioration diagnosis of the structure 140 based on the deflection amount 1157 stored in the storage unit 115. Moreover, the diagnostic unit 1167 is configured to store a diagnosis result into the diagnosis result database 1158. Moreover, the diagnostic unit 1167 is configured to display the diagnosis result on the screen display unit 114, and/or transmit the diagnosis result to an external terminal through the communication I/F unit 112. The diagnostic unit 1167 performs a deterioration diagnosis of the structure 140, for example, by the following method.

The diagnostic unit 1167 generates a distribution of the deflection amount 1157 for each section of deflection due to the weight of a single vehicle. For example, the diagnostic unit 1167 divides deflection amount into several classes, and generates a histogram in which the frequency of appearance for each class is graphed. Next, the diagnostic unit 1167 extracts a deflection amount corresponding to a car from the above distribution. Since a car belongs to a small vehicle, a deflection amount due to a car tends to be small as compared with a deflection amount due to a large vehicle. Therefore, a deflection amount corresponding to a car tends to appear on the lower side of the distribution. Next, the diagnostic unit 1167 determines the soundness of the structure 140 by using the extracted deflection amount of car as an index value for determining deterioration. For example, the diagnostic unit 1167 compares the extracted deflection amount of car with an allowable deflection amount that is previously set and stored and, if the deflection amount of car does not exceed the allowable deflection amount, determines that the structure 140 is sound and otherwise determines that the structure 140 has deteriorated. In the above description, a deflection amount corresponding to a car is extracted from the distribution of deflection amounts to determine deterioration, but the present invention is not limited thereto. For example, the diagnostic unit 1167 may use the average value, the mode value, the maximum value, or the minimum value of the histogram as an index value for determining deterioration.

Figure 6:
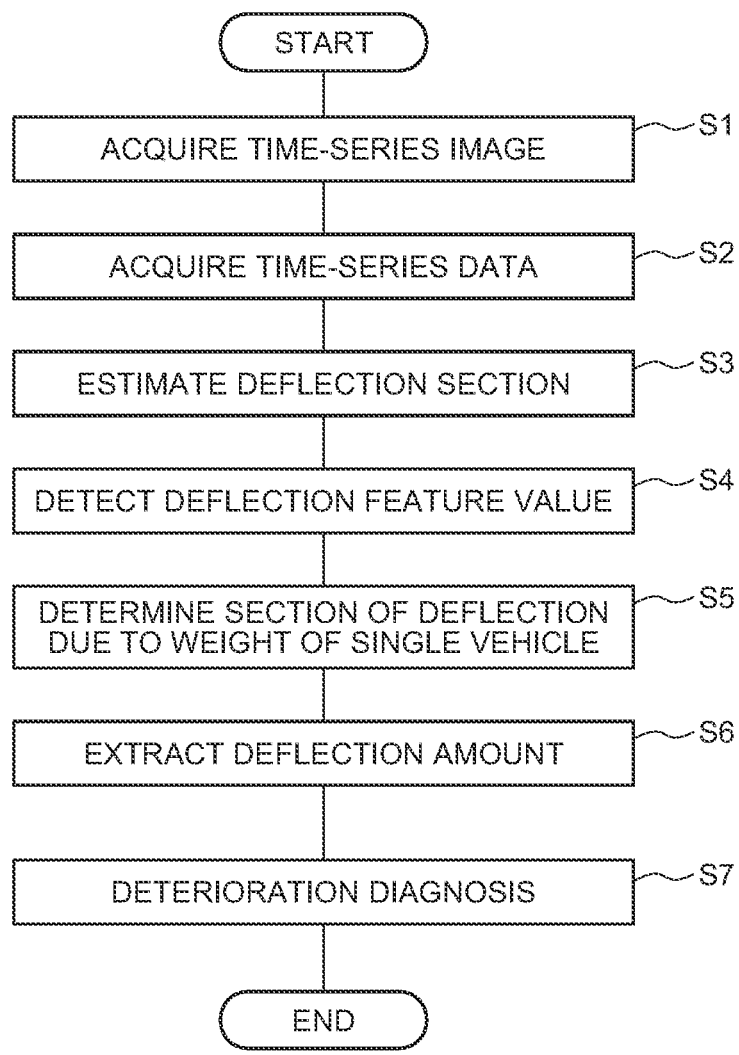
FIG. 6 is a flowchart showing an example of an operation of the diagnostic apparatus according to the first example embodiment of the present invention.

FIG. 6 is a flowchart showing an example of an operation of the diagnostic apparatus 100. Below, with reference to the drawings, an operation of the diagnostic apparatus 100 when performing a deterioration diagnosis of the structure 140 will be described.

When an operator installs measurement devices such as the computer 110 and the camera 130 at sites and inputs an activation instruction through the operation input unit 113 in order to perform a deterioration diagnosis of the structure 140, a process shown in FIG. 6 is started by the computer 110.

First, the image acquisition unit 1161 starts operating. The image acquisition unit 1161 acquires a time-series image of the region 141 of the structure 140 captured by the camera 130, and sequentially stores as the time-series image 1152 into the storage unit 115 (step S1). The acquisition of the time-series image by the image acquisition unit 1161 is continued until a time-series image for a predetermined time or a predetermined quantity of time-series image is acquired. After that, the following process is executed.

First, the time-series data acquisition unit 1162 retrieves the time-series image 1152 from the storage unit 115, analyzes the retrieved time-series image 1152, acquires a deflection amount on the structure 140 due to the weight of a vehicle traveling on the structure 140 along a time series, and stores the acquired time series of the acquired deflection amounts as the time-series data 1153 into the storage unit 115 (step S2). Next, the section estimation unit 1163 retrieves the time-series data 1153 from the storage unit 115, analyzes the time-series data 1153, estimates a section in which deflection is caused on the structure 140, and stores as the deflection section 1154 into the storage unit 115 (step S3). Next, the feature value detection unit 1164 retrieves the time-series data 1153 and the deflection section 1154 from the storage unit 115, detect, for each deflection section indicated by the deflection section 1154, a feature value (a maximal value, a minimal value) of the change in deflection amount within the deflection section from the time-series data 1153, and stores as the deflection feature value 1155 into the storage unit 115 (step S4). Next, the determination unit 1165 retrieves the deflection feature value 1155 of each deflection section from the storage unit 115, determine for each deflection section whether or not to be a section of deflection due to the weight of a single vehicle based on the deflection feature value 1155 of the deflection section, and stores as the determination result 1156 into the storage unit 115 (step S5). Next, the extraction unit 1166 retrieves the determination result 1156 from the storage unit 115, extracts the maximum value of deflection amounts from the time-series data 1153 within the deflection section detected as a section of deflection due to the weight of a single vehicle, and stores as the deflection amount 1157 into the storage unit 115 (step S6). Next, the diagnostic unit 1167 retrieves the deflection amount 1157 from the storage unit 115, and performs a deterioration diagnosis of the structure 140 based on the deflection amount 1157 (step S7).

As described above, according to this example embodiment, it is possible to simply calculate the amount of deflection caused on the structure 140 by the weight of a single vehicle. The reason is that based on a feature value of a change in deflection amount within a section in which deflection is caused, it is determined whether or not a deflection section is a section of deflection due to the weight of a single vehicle.

Further, according to this example embodiment, it is possible to perform a deterioration diagnosis of the structure 140 based on the amount of deflection caused on the structure 140 by the weight of a single vehicle.

In this example embodiment, various additions and changes are possible. For example, in this example embodiment, a deflection amount is detected. However, a displacement amount to be detected is not limited to a deflection amount. For example, in a case where the structure 140 has a crack, the width of the crack increases when a load is applied to the structure 140. Therefore, the width of a crack of the structure may be associated with a vehicle weight.

Further, in this example embodiment, displacement of the structure 140 is detected based on an image captured by a camera capturing the structure 140. However, the sensor detecting displacement of the structure 140 is not limited to the camera. For example, a laser range finder may be used to detect a deflection amount of the structure 140. Moreover, for example, a strain gauge may be used to detect displacement such as a deflection amount or a crack width of the structure 140.

Second Example Embodiment

Figure 7:
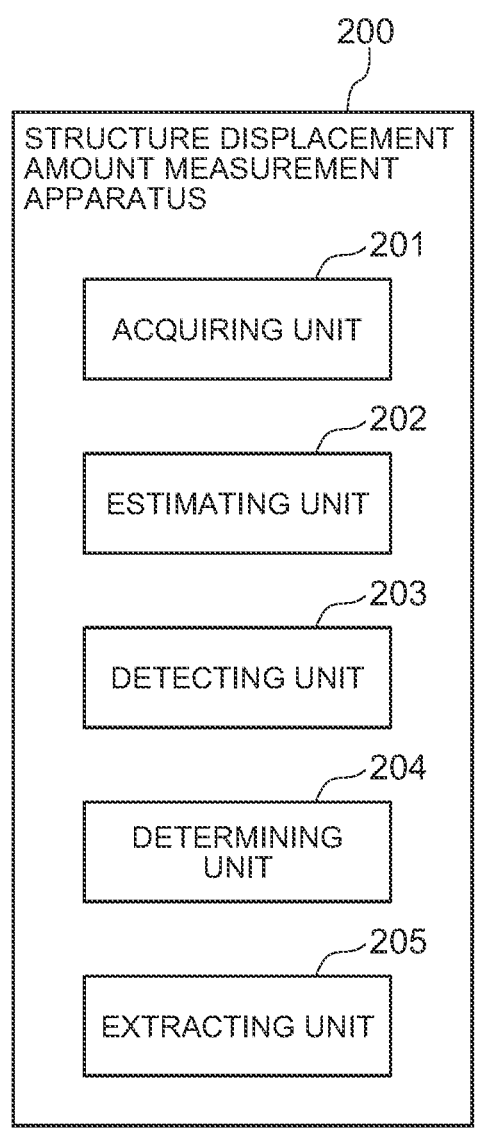
FIG. 7 is a block diagram of a structure displacement amount measurement apparatus according to a second example embodiment of the present invention.

Next, a second example embodiment of the present invention will be described with reference to FIG. 7. FIG. 7 is a block diagram of a structure displacement amount measurement apparatus according to this example embodiment. In this example embodiment, the overview of the structure displacement amount measurement apparatus according to the present invention will be described.

Referring to FIG. 7, a structure displacement amount measurement apparatus 200 according to this example embodiment includes an acquiring unit 201, an estimating unit 202, a detecting unit 203, a determining unit 204, and an extracting unit 205.

The acquiring unit 201 is configured to acquire the amount of displacement caused on a structure due to the weight of a vehicle traveling on the structure along a time series. The acquiring unit 201 can be configured, for example, in the same manner as the time-series data acquisition unit 1162 of FIG. 2, but is not limited thereto.

The estimating unit 202 is configured to estimate a section in which displacement is caused based on time-series data of the displacement amount acquired by the acquiring unit 201. The estimating unit 202 can be configured, for example, in the same manner as the section estimation unit 1163 of FIG. 2, but is not limited thereto.

The detecting unit 203 is configured to detect a feature value of a change in deflection amount within the section estimated by the estimating unit 202. The detecting unit 203 can be configured, for example, in the same manner as the feature value detection unit 1164 of FIG. 2, but is not limited thereto.

The determining unit 204 is configured to determine whether or not the section estimated by the estimating unit 202 is a section of displacement due to the weight of a single vehicle based on the feature value detected by the detecting unit 203. The determining unit 204 can be configured, for example, in the same manner as the determination unit 1165 of FIG. 2, but is not limited thereto.

The extracting unit 205 is configured to extract a displacement amount from time-series data within a section of displacement due to the weight of a single vehicle based on the result of determination by the determining unit 204. The extracting unit 205 can be configured, for example, in the same manner as the extraction unit 1166 of FIG. 2, but is not limited thereto.

The structure displacement amount measurement apparatus 200 thus configured operates in the following manner. First, the acquiring unit 201 acquires the amount of displacement caused on a structure due to the weight of a vehicle traveling on the structure along a time series. Next, the estimating unit 202 estimates a section in which displacement is caused based on time-series data of the displacement amount acquired by the acquiring unit 201. Next, the detecting unit 203 detects a feature value of a change in deflection amount within the section estimated by the estimating unit 202. Next, the determining unit 204 determines whether or not the section estimated by the estimating unit 202 is a section of displacement due to the weight of a single vehicle based on the feature value detected by the detecting unit 203. Next, the extracting unit 205 extracts a displacement amount from time-series data within a section of displacement due to the weight of a single vehicle based on the result of determination by the determining unit 204.

With the configuration and operation as described above, this example embodiment makes it possible to simply calculate the amount of displacement caused on the structure 140 by the weight of a single vehicle. The reason is that it is determined whether or not a displacement section is a section of displacement due to the weight of a single vehicle based on a feature value of a change in displacement amount within a section in which displacement is caused.

Although the present invention has been described above with reference to the example embodiments, the present invention is not limited to the above example embodiments. The configurations and details of the present invention can be changed in various manners that can be understood by one skilled in the art within the scope of the present invention.

The present invention is based upon and claims the benefit of priority from Japanese patent application No. 2019-037816, filed on Mar. 1, 2019, the disclosure of which is incorporated herein in its entirety by reference.

The present invention can be utilized, for example, in the case of measuring a displacement amount such as a deflection amount of a structure such as a bridge caused by a vehicle passing the structure.

The whole or part of the example embodiments disclosed above can be described as, but not limited to, the following supplementary notes.

[Supplementary Note 1]

A structure displacement amount measurement apparatus comprising:

an acquiring unit configured to acquire a displacement amount caused on a structure due to a weight of a vehicle traveling on the structure along a time series;

an estimating unit configured to estimate a section in which displacement is caused based on time-series data of the displacement amount;

a detecting unit configured to detect a feature value of change in displacement amount within the estimated section;

a determining unit configured to determine whether or not the estimated section is a section of displacement due to a weight of a single vehicle based on the detected feature value; and an extracting unit configured to extract a displacement amount from the time-series data within a section of displacement due to a weight of a single vehicle based on a result of the determination.

[Supplementary Note 2]

The structure displacement amount measurement apparatus according to Supplementary Note 1, wherein the estimating unit is configured to estimate a section in which displacement is caused by comparing the time-series data with a displacement detection threshold value previously set and stored.

[Supplementary Note 3]

The structure displacement amount measurement apparatus according to Supplementary Note 1, wherein the estimating unit is configured to:

divide the time-series data into a plurality of partial time-series data;

detect, for each of the partial time-series data, time $t_{max}$ at which a rate of change in displacement becomes maximum from the partial time-series data;

detect first time $t_s$ at which both the rate of change in displacement and an acceleration become equal to or less than a threshold rate and a threshold acceleration that are previously set and stored while returning to past time by unit time starting from the time $t_{max}$, and detect first time $t_e$ at which both the rate of change in deflection amount and the acceleration become equal to or less than the threshold rate and the threshold acceleration while advancing to future time by unit time starting from the time $t_{max}$; and estimate a section from the time $t_s$ to the time $t_e$ as a section in which displacement is caused.

[Supplementary Note 4]

The structure displacement amount measurement apparatus according to any of Supplementary Notes 1 to 3, wherein:

the detecting unit is configured to detect a maximal value of the displacement amount; and the determining unit is configured to determine whether or not the estimated section is a section of displacement due to a weight of a single vehicle based on the number of the detected maximal value.

[Supplementary Note 5]

The structure displacement amount measurement apparatus according to any of Supplementary Notes 1 to 3, wherein the detecting unit is configured to detect a minimal value of the displacement amount; and the determining unit is configured to determine whether or not the estimated section is a section of displacement due to a weight of a single vehicle based on the number of the detected minimal value.

[Supplementary Note 6]

The structure displacement amount measurement apparatus according to any of Supplementary Notes 1 to 5, further comprising a diagnosing unit configured to perform a deterioration diagnosis of the structure based on the extracted displacement amount.

[Supplementary Note 7]

A structure displacement amount measurement method comprising:

acquiring a displacement amount caused on a structure by a weight of a vehicle traveling on the structure along a time series;

estimating a section in which displacement is caused based on time-series data of the displacement amount;

detecting a feature value of change in displacement amount within the estimated section;

determining whether or not the estimated section is a section of displacement due to a weight of a single vehicle based on the detected feature value; and extracting a displacement amount from the time-series data within a section of displacement due to a weight of a single vehicle based on a result of the determination.

[Supplementary Note 8]

A non-transitory computer-readable recording medium on which a program is recorded, the program comprising instructions for causing a computer to execute:

a process of acquiring a displacement amount caused on a structure by a weight of a vehicle traveling on the structure along a time series;

a process of estimating a section in which displacement is caused based on time-series data of the displacement amount;

a process of detecting a feature value of change in displacement amount within the estimated section;

a process of determining whether or not the estimated section is a section of displacement due to a weight of a single vehicle based on the detected feature value; and a process of extracting a displacement amount from the time-series data within a section of displacement due to a weight of a single vehicle based on a result of the determination.

DESCRIPTION OF NUMERALS 100 diagnostic apparatus
110 computer
111 camera I/F unit
112 communication I/F unit
113 operation input unit
114 screen display unit
115 storage unit
116 arithmetic processing unit
120 cable
130 camera
140 structure
141 region
160 road
200 structure displacement amount measurement apparatus
201 acquiring unit
202 estimating unit
203 detecting unit
204 determining unit
205 extracting unit

What is claimed is:

1. A structure displacement amount measurement apparatus comprising:

a memory containing program instructions; and a processor coupled to the memory, wherein the processor is configured to execute the program instructions to:

measure, at each of a plurality of times over a period of time, a displacement amount generated on a measurement spot on a floor deck of a target bridge by structure due to a weight of a vehicle traveling on the target bridge, which is to be diagnosed, wherein the displacement amount is measured by analyzing time-series images of the measurement spot captured by a camera substantially immediately below the measurement spot;

estimate, within the period of time, a section of time in which deflection of the target bridge occurred, based on the displacement amount measured at each of the plurality of times over the period of time;

detect a number of maximal values and a number of minimal values of change in displacement amount the displacement amount measured within the section of time;

in response to the number of maximal values being equal to one and the number of minimal values being equal to zero, correspond the maximal value as the displacement caused by the weight of only the vehicle; and generate a histogram of the displacement amount caused by the weight of only the vehicle; and perform deterioration diagnosis of the target bridge based on the generated histogram, and output a result of the deterioration diagnosis.

2. The structure displacement amount measurement apparatus according to claim 1, wherein
the section of time section is estimated by comparing the displacement amount measured at each of the plurality of times over the period of time with a displacement detection threshold value previously set and stored.

3. The structure displacement amount measurement apparatus according to claim 1, wherein
the section of time is estimated by:
dividing the period of time into a plurality of sub-periods of time;
for each of the plurality of sub-periods of time partial time series data, detecting a time $t_{max}$ at which a rate of change in the displacement amount becomes maximum;
detecting a first time $t_s$ at which both the rate of change in the displacement amount and an acceleration become equal to or less than a threshold rate and a threshold acceleration that are previously set and stored, starting from the time $t_{max}$ in a prior sub-period of time;
detecting a first time $t_e$ at which both the rate of change in the displacement amount and the acceleration become equal to or less than the threshold rate and the threshold acceleration, starting from the time $t_{max}$ in a subsequent sub-period of time; and
set a section from the time $t_s$ to the time $t_e$ as the estimated section of time.

4. The structure displacement amount measurement apparatus according to claim 1, wherein
detection of the number of maximal values and the number of minimal values includes generation of a change pattern of the amount of deflection by applying a low-pass filter to the displacement amount measured at each of the plurality of times within the estimated section of time and detecting the number of the maximal values and the number of the minimum values from the generated change pattern.

5. The structure displacement amount measurement apparatus, according to claim 1, wherein
detection of the number of maximal values and the number of minimal values includes generation of a change pattern of the amount of deflection by using an approximate curve that minimizes a squared error of a distance from the displacement amount measured at each of the plurality of times within the estimated section of time and detecting the number of the maximal values and the number of the minimum values from the generated change pattern.

6. A structure displacement amount measurement method comprising:
measuring, by a processor and at each of a plurality of times over a period of time, a displacement amount generated on a measurement spot on a floor deck of a target bridge by a weight of a vehicle traveling on the target bridge, which is to be diagnosed, wherein the displacement amount is measured by analyzing time-series images of the measurement spot captured by a camera substantially immediately below the measurement spot;
estimating, by the processor and within the period of time, a section of time in which deflection of the target bridge occurred, based on the displacement amount measured at each of the plurality of times over the period of time;
detecting, by the processor, a number of maximal values and a number of minimal values of the displacement amount measured within the section of time;
in response to the number of maximal values being equal to one and the number of minimal values being equal to zero, corresponding, by the processor, the maximal value as the displacement caused by the weight of only the vehicle; and
generating, by the processor, a histogram of the displacement amount caused by the weight of only the vehicle; and
performing, by the processor, deterioration diagnosis of the target bridge based on the generated histogram, and output a result of the deterioration diagnosis.

7. A non-transitory computer-readable recording medium on which storing a program executable by a processor to perform:
measuring, at each of a plurality of times over a period of time, a displacement amount generated on a measurement spot on a floor deck of a target bridge by a weight of a vehicle traveling on the target bridge, which is to be diagnosed, wherein the displacement amount is measured by analyzing time-series images of the measurement spot captured by a camera substantially immediately below the measurement spot;
a process of estimating, within the period of time, a section of time in which deflection of the target bridge occurred, based on the displacement amount measured at each of the plurality of times over the period of time;
detecting a number of maximal values and a number of minimal values of the displacement amount measured within the section of time;
in response to the number of maximal values being equal to one and the number of minimal values being equal to zero, corresponding the maximal value as the displacement caused by the weight of only the vehicle; and
generating a histogram of the displacement amount caused by the weight of only the vehicle; and
performing deterioration diagnosis of the target bridge based on the generated histogram, and output a result of the deterioration diagnosis.

* * * * *